United States Patent Office 2,885,428
Patented May 5, 1959

2,885,428

2-ISOTHIOCYANATOISOCAMPHANE

Leo S. Luskin, Philadelphia, Pa., assignor to Rohm & Haas Company, Philadelphia, Pa., a corporation of Delaware No Drawing. Application January 8, 1958
Serial No. 707,690

6 Claims. (Cl. 260—454)

This invention deals with 2-isothiocyanatoisocamphane as a new composition of matter. It further refers to a method for the preparation of 2-isothiocyanatoisocamphane.

The present invention concerns the production of 2-isothiocyanatoisocamphane by reacting camphene with isothiocyanic acid. The present reaction is readily consummated with certainty of result in yields that are substantially quantitative. The present reaction is characterized by the fact that the desired product is the only one obtained although it is known in the art that camphene and like compounds, when subjected to many reactions, usually undergo structural rearrangements so that the outcome of reactions is difficult to predict and products are obtained with uncertainty in their structure, identity, and homogeneity. The present reaction does not exhibit these disturbing uncertainties. The present reaction is consummated by generating the isothiocyanic acid reactant in the reaction medium, preferably by using an alkali metal thiocyanate or an obvious equivalent such as ammonium thiocyanate and then a strong acid such as sulfuric acid in concentrations greater than 30%. The reaction temperatures in the range of 10° to 75° C. may be employed, preferably 45° to 60° C. The product is isolated from the reaction mixture, preferably by the addition of water and a volatile organic solvent such as benzene, toluene, or the like. The reaction mixture stratifies and the organic layer is removed. Subsequent conventional steps of purification may be employed such as washing with water, filtering if necessary, drying if desired, and finally distilling. The product is a white crystalline material having a melting point of 84° to 86° C. It is useful in pharmaceutical applications, in that it can be readily converted into N-methyl-2-aminoisocamphane which has a value as a ganglionic blocking agent. It is further useful as a fungicide especially when applied against *Stemphylium sarcinaeforme* and *Monolina fructicola* according to standard methods. The present product may also be employed as the active insecticidal agent in fly spray formulations.

The present invention may be more fully understood from the following example which is offered by way of illustration and not by way of limitation. Parts by weight are used throughout.

*Example*

Sodium thiocyanate (41 parts), which is suspended in molten camphene (68 parts), is stirred at 55° to 60° C. during the slow addition of 42 parts of aqueous 73% sulfuric acid. The mixture is then stirred for five hours at 55° C. and cooled. There are then introduced 200 parts of benzene and 100 parts of water. The mixture stratifies and the benzene layer is removed and washed with aqueous sodium carbonate solution and water. The benzene layer is distilled giving an oil which boils at 107° to 108° C. at 2 mm. absolute pressure. This oil solidifies and can be recrystallized several times from ethanol to give a white solid having a melting point of 85° to 86° C. The product is identified by analysis and contains 7.0% nitrogen (7.2% theoretical), and 16.1% sulfur (16.4% theoretical). The product is identified as 2-isothiocyanatoisocamphane. The structure is confirmed by its infra-red spectrum and by its conversion to N-methylaminoisocamphane.

In a similar manner, the same product was obtained by employing potassium thiocyanate and sulfuric acid.

I claim:

1. As a new composition of matter, 2-isothiocyanatoisocamphane.

2. A method for the preparation of 2-isothiocyanatoisocamphane which comprises bringing together and causing to react in the temperature range of about 10° to 75° C., camphene with isothiocyanic acid.

3. A method for the preparation of 2-isothiocyanatoisocamphane which comprises bringing together and causing to react in the temperature range of about 10° to 75° C., camphene with isothiocyanic acid, said acid being generated in the reaction medium.

4. A method for the preparation of 2-isothiocyanatoisocamphane which comprises bringing together and causing to react in the temperature range of about 45° to 60° C., camphene with isothiocyanic acid, said acid being generated in the reaction medium.

5. A method for the preparation of 2-isothiocyanatoisocamphane which comprises bringing together and causing to react in the temperature range of about 10° to 75° C., camphene with isothiocyanic acid, said acid being generated in the reaction medium by the action of a strong acid and a member from the class consisting of an alkali metal thiocyanate and an ammonium thiocyanate.

6. A method for the preparation of 2-isothiocyanatoisocamphane which comprises bringing together and causing to react in the temperature range of about 45° to 60° C., camphene with isothiocyanic acid, said acid being generated in the reaction medium by the action of a strong acid and a member from the class consisting of an alkali metal thiocyanate and an ammonium thiocyanate.

References Cited in the file of this patent

UNITED STATES PATENTS 2,689,255    Craig et al. _____ Sept. 14, 1954